(12) United States Patent
Butler et al.

(10) Patent No.: US 7,761,629 B2
(45) Date of Patent: Jul. 20, 2010

(54) METHOD FOR USING HOST AND STORAGE CONTROLLER PORT INFORMATION TO CONFIGURE PATHS BETWEEN A HOST AND STORAGE CONTROLLER

(75) Inventors: Eric Kevin Butler, San Jose, CA (US); Pi-Wei Chin, Sunnyvale, CA (US); Scott J. Colbeck, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/757,896

(22) Filed: Jun. 4, 2007

(65) Prior Publication Data
US 2008/0301332 A1 Dec. 4, 2008

(51) Int. Cl.
G06F 3/00 (2006.01)
G06F 5/00 (2006.01)
G06F 13/12 (2006.01)
G06F 13/38 (2006.01)

(52) U.S. Cl. .............................. 710/74; 710/8; 710/38
(58) Field of Classification Search .................. 710/74, 710/8, 38
See application file for complete search history.

(56) References Cited

U.S. PATENT DOCUMENTS

| 6,581,102 | B1 | 6/2003 | Amini et al. | |
| 6,775,230 | B1 * | 8/2004 | Watanabe et al. | 370/228 |
| 6,898,670 | B2 | 5/2005 | Nahum | |
| 7,307,948 | B2 * | 12/2007 | Infante et al. | 370/225 |
| 2002/0156887 | A1 | 10/2002 | Hashimoto | |
| 2003/0189929 | A1 | 10/2003 | Matsuzaki et al. | |

(Continued)

OTHER PUBLICATIONS

S. Tracey, et al., "Increasing Storage Area Network Productivity", Sun Microsystems, Part No. 817-7544-10, Revision 1.0 Jun. 28, 2004, Edition: Jul. 2004 .

(Continued)

*Primary Examiner*—Niketa I Patel
*Assistant Examiner*—Zachary K Huson
(74) *Attorney, Agent, or Firm*—David W. Victor; Konrad Raynes and Victor LLP

(57) ABSTRACT

Provided is a method for using host and storage controller port information to configure paths between a host and storage controller. Information is gathered on ports on at least one host, ports on at least one storage controller managing access to storage volumes, and at least one fabric over which the at least one host and storage controller ports connect. For at least one host port and storage controller port, information is gathered on a connection metric related to a number of paths in which the port is configured and a traffic metric indicating Input/Output (I/O) traffic at the port. A determination is made of available ports for one host and storage controller that are available to provide paths between one host and storage controller. The connection and traffic metrics for the available host ports are processed to select at least one host port. The connection and traffic metrics for the available storage controller ports are processed to select at least one storage controller port. The at least one selected host and storage controller port pair are configured to provide at least one path enabling the host to communicate with the selected storage controller port to access at least one storage volume managed by the selected storage controller.

21 Claims, 7 Drawing Sheets

U.S. PATENT DOCUMENTS

| | | |
|---|---|---|
| 2004/0047294 A1 | 3/2004 | Ain et al. |
| 2005/0091353 A1 | 4/2005 | Gopisetty et al. |
| 2005/0185597 A1 | 8/2005 | Le et al. |
| 2006/0092843 A1 | 5/2006 | Iwami |
| 2006/0230189 A1 | 10/2006 | Sahara et al. |
| 2008/0301332 A1 | 12/2008 | Butler et al. |
| 2008/0301333 A1 | 12/2008 | Butler et al. |

OTHER PUBLICATIONS

U.S. Patent Application entitled "System and Article of Manufacture for Using Host and Storage Controller Port Information to Configure Paths Between a Host and Storage Controller", Serial No. unknown, filed Jun. 5, 2007, IBM Docket No. SJO920070017US2, by inventors E.K. Butler, P. Chin, S.J. Colbeck and K. Voruganti.

First Office Action, dated Nov. 14, 2008, for U.S. Appl. No. 11/757,902, 23 pp.

Second Office Action, dated Jun. 1, 2009, for U.S. Appl. No. 11/757,902, 11 pp.

S. Tracey et al., "Increasing Storage Area Network Productivity", Sun Microsystems, Part No. 817-7544-10, Revision 1.0 Jun. 28, 2004, Edition : Jul. 2004, 17 pgs.

* cited by examiner

METHOD FOR USING HOST AND STORAGE CONTROLLER PORT INFORMATION TO CONFIGURE PATHS BETWEEN A HOST AND STORAGE CONTROLLER

BACKGROUND OF THE INVENTION

1. Field of the Invention

The present invention relates to a method for using host and storage controller port information to configure paths between a host and storage controller

2. Description of the Related Art

Host systems in a storage network may communicate with a storage controller through multiple paths over one or more fabrics of switches. Each host port may connect to multiple storage controller ports via fabric switches and each storage controller port may connect to multiple host ports. An administrator may configure paths for a host to use to communicate Input/Output (I/O) requests to a storage controller to access storage volumes managed by the storage controller. The administrator may manually examine a topology of a network system to determine which host and storage controller ports to use to configure paths for I/O communication. The administrator may take into account customer policies in determining the number of paths to configure for a host.

An administrator may configure a mapping of host ports to logical volumes, such as Logical Unit Numbers (LUNs) the storage controller configures in storage and mask them on every port on the storage controller. The administrator may take into account the network traffic and usage of hosts, storage controllers and ports in determining how to allocate and configure pathing resources.

There is a need in the art for improved techniques for forming paths in a network between hosts and storage controllers.

SUMMARY

Provided is a method for using host and storage controller port information to configure paths between a host and storage controller. Information is gathered on ports on at least one host, ports on at least one storage controller managing access to storage volumes, and at least one fabric over which the at least one host and storage controller ports connect. For at least one host port and storage controller port, information is gathered on a connection metric related to a number of paths in which the port is configured and a traffic metric indicating Input/Output (I/O) traffic at the port. A determination is made of available ports for one host and storage controller that are available to provide paths between one host and storage controller. The connection and traffic metrics for the available host ports are processed to select at least one host port. The connection and traffic metrics for the available storage controller ports are processed to select at least one storage controller port. The at least one selected host and storage controller port pair are configured to provide at least one path enabling the host to communicate with the selected storage controller port to access at least one storage volume managed by the selected storage controller.

In a further embodiment, a determination is made of a path policy indicating a number of paths to configure between the host and the storage controller, wherein a number of the selected at least one host and storage controller port pairs comprise the number of paths required by the determined path policy. The indicated number of paths are configured between selected host and storage controller ports.

In a further embodiment, for at least one port, a port metric is calculated as a function of the connection metric and the traffic metric. Selecting the host port comprises selecting the host port based on the port metrics of the available host ports and selecting the storage controller port comprises selecting the storage controller based on the port metrics of the storage controller port.

In a further embodiment, calculating the port metric comprises determining a connection usage indicating a relative value for a number of paths in which the port is configured and determining a traffic usage comprising a relative value of the I/O traffic at the port; wherein the port metric comprises a function of the connection usage and the traffic usage values.

In a further embodiment, determining the connection usage value for a host and storage controller port comprises determining a ratio of the connection metric and a maximum number of connections permitted at the port. Determining the traffic usage comprises determining a ratio of the traffic at the port and a total traffic at all the ports in the storage controller. The selected host port comprises the host port having a lowest port metric of the available host port metrics and the selected storage controller port comprises the storage controller port having a lowest port metric of the available storage controller port metrics.

In a further embodiment, a determination is made of an estimated increase in traffic at the at least one selected host port and storage controller pair resulting from configuring the at least one selected host and storage controller port pair to provide the at least one path. The traffic metric of the selected at least one host and storage controller port pair is adjusted to include the determined estimated increase in traffic.

In a further embodiment, gathering the information further comprises querying host bus adaptor (HBA) drivers in the at least one host to obtain information on the host ports. A network manager is queried to obtain information on the storage controller ports.

In a further embodiment, the selected storage controller port and host pair connection metric are incremented.

In a further embodiment, a request is received to provide one host access to a storage volume managed by one of the storage controllers. The available ports are determined for the host indicated in the request and the storage controller providing access to the storage volume indicated in the request. The configured path enables the host indicated in the request to access the storage volume indicated in the request.

In a further embodiment, the connection and traffic metrics for host ports are processed to determine one host or storage controller port having a high usage relative to other host or storage controller ports. One path is configured for the determined high usage host or storage controller port. The available and selected host and storage controller ports for which the path is configured are on the host and storage controller connected by the removed path. The configured at least one path replaces the removed path.

In a further embodiment, a determination is made of an estimated decrease in I/O traffic at the host and storage controller ports in the removed path. The traffic metric of the host and storage controller ports in the removed path is adjusted by subtracting the estimated decrease in I/O traffic. The host and storage controller ports in the removed path are decremented.

DETAILED DESCRIPTION

Figure 1:
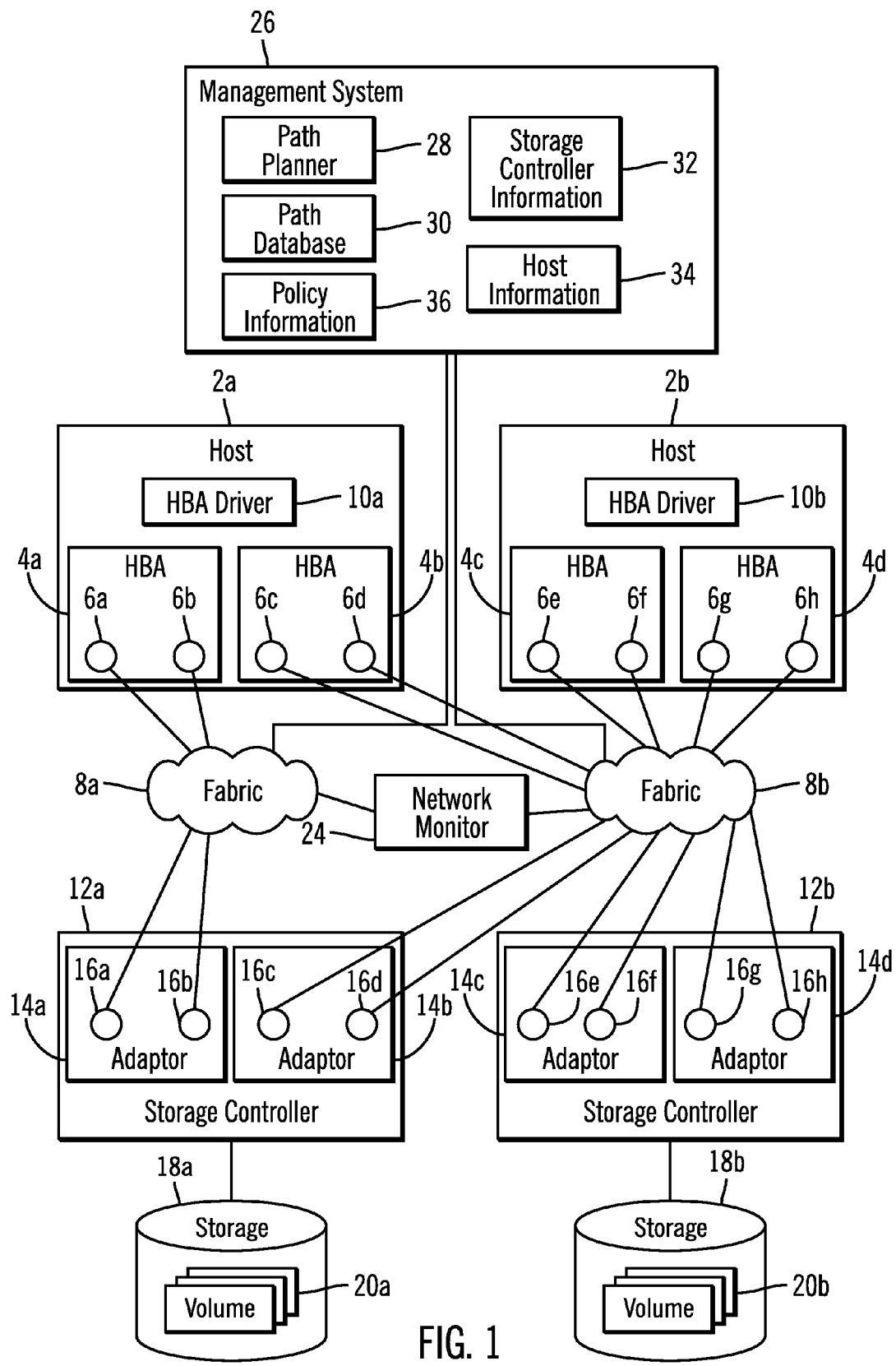
FIG. 1 illustrates an embodiment of a network computing environment.

FIG. 1 illustrates an embodiment of a network computing environment. Host systems 2a, 2b include one or more host bus adaptors (HBAs) 4a, 4b, 4c, 4d (two are shown in each host as an example), where each HBA 4a, 4b, 4c, 4d includes one or more ports 6a, 6b, 6c, 6d, 6e, 6f, 6g, 6h (two are shown in each HBA as an example) to connect the hosts 2a, 2b to one or more fabrics 8a, 8b. The fabrics 8a, 8b are comprised of one or more switches that enable one host or storage controller port to connect to multiple other ports.

Storage controllers 12a, 12b include one or more adaptors 14a, 14b, 14c, 14d (two are shown in each storage controller as an example), where each adaptor 14a, 14b, 14c, 14d includes one or more ports 16a, 16b, 16c, 16d, 16e, 16f, 16g, 16h (two are shown in each HBA as an example) to connect the storage controllers 12a, 12b to one or more of the fabrics 8a, 8b. The storage controllers 12a, 12b manage access to storages 18a, 18b, respectively, in which one or more volumes 20a, 20b (e.g., Logical Unit Numbers, Logical Devices, etc.) are configured.

Multiple paths may be configured between one host port 6a, 6b, 6c, 6d, 6e, 6f, 6g, 6h to different storage controller ports 16a, 16b, 16c, 16d, 16e, 16f, 16g, 16h and between one storage controller port 16a, 16b, 16c, 16d, 16e, 16f, 16g, 16h and multiple host ports 6a, 6b, 6c, 6d, 6e, 6f, 6g, 6h.

The hosts 2a, 2b include HBA drivers 10a, 10b to interface between the host 2a, 2b operating systems and applications and the HBAs 4a, 4b, 4c, 4d. The HBA drivers 10a, 10b may maintain information on paths configured between the host ports 6a, 6b, 6c, 6d, 6e, 6f, 6g, 6h in the host 2a, 2b in which they execute and the storage controller ports 16a, 16b, 16c, 16d, 16e, 16f, 16g, 16h. The HBA drivers 10a, 10b may further gather Input/Output (I/O) traffic statistics for each host port 6a, 6b, 6c, 6d, 6e, 6f, 6g, 6h, such as the number of bytes transferred, number of I/Os, transfer rate, error rate, etc.

A network monitor 24 gathers information on the network topology from the fabric 8a, 8b components, such as switches, and from the elements connected to the fabrics, such as the hosts and storage controllers. The network monitor 24 gathering network topology information for multiple fabrics 8a, 8b may be implemented on a single system or host. Alternatively, there may be multiple network monitor 24 instances, where each may gather information on one or more fabrics 8a, 8b. The network monitor 24 may be implemented on a host system or on one of the storage controllers 12a, 12b.

A management system 26 includes a path planner 28 program that is capable of using load balancing algorithms to configure paths in the fabrics 8a, 8b, a path database 30 providing information on paths between host and storage controller ports configured paths in the fabrics 8a, 8b, storage controller information 30 provide information on storage controllers 2a, 2b connected to the fabric 8a, 8b and their ports 16a, 16b, 16c, 16d, 16e, 16f, 16g, 16h and host information 32 providing information on hosts connected to the fabrics 8a, 8b and their ports 6a, 6b, 6c, 6d, 6e, 6f, 6g, 6h. Although the management system 26 is shown as a separate system, the components 28, 30, 34, and 34 may be implemented in any host 2a, 2b or storage controller 12a, 12b.

The path planner 28 may also maintain policy information 36. The policy information 36 may indicate required network resources to configure for a host 2a, 2b, application executing in the host 2a, 2b, or a type of data. A host policy may specify a number of redundant paths that need to be configured between a host 2a, 2b and storage controller 12a, 12b, whether redundant storage volumes 20a, 20b should be assigned, whether redundant fabrics and/or storage controllers must be used for the paths, etc.

The network monitor 24 may communicate with the hosts 2a, 2b, fabric 8a, 8b switches, and storage controllers 12a, 12b over an out-of-band network 32 with respect to the fabrics 8a, 8b, or paths over which the hosts and storage controller communicate. Alternatively, the hosts 2a, 2b, manager system 26, and storage controllers 12a, 12b may communicate I/O requests and coordination related information over the fabrics 8a, 8b.

The storage controller 12a, 12b may comprise suitable storage controllers or servers known in the art, such as the International Business Machines (IBM®) Enterprise Storage Server® (ESS) (IBM and Enterprise Storage Server are registered trademarks of IBM®). Alternatively, the storage controllers 12a, 12b may comprise a lower-end storage server as opposed to a high-end enterprise storage server. The hosts 2a, 2b may comprise computing devices known in the art, such as a server, mainframe, workstation, personal computer, hand held computer, laptop, telephony device, network appliance, etc. The fabrics 8a, 8b may implement a network such as a Storage Area Network (SAN), Local Area Network (LAN), Intranet, the Internet, Wide Area Network (WAN), etc. The fabrics 8a, 8b may each be comprised of interconnecting switches. The storages 18a, 18b may comprise an array of storage devices, such as a Just a Bunch of Disks (JBOD), Direct Access Storage Device (DASD), Redundant Array of Independent Disks (RAID) array, virtualization device, tape storage, flash memory, etc.

Further, there may be additional hosts, storage controllers, fabrics, and adaptors and ports on these devices than shown in FIG. 1.

Figure 2:
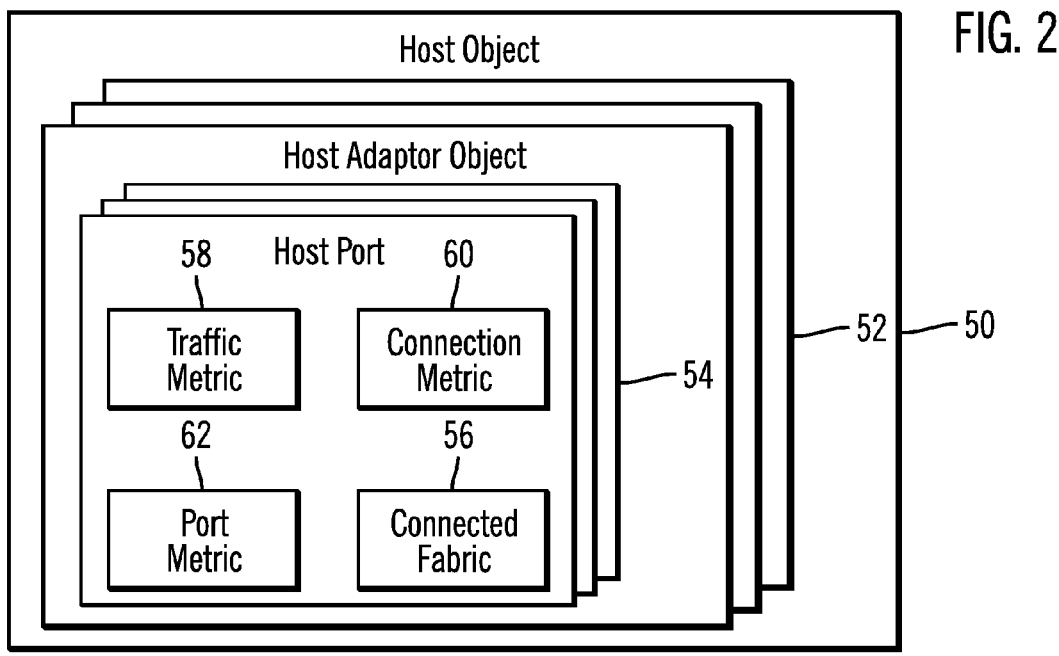
FIG. 2 illustrates an embodiment of a host object.

FIG. 2 illustrates an embodiment of host information 34. The path planner 28 may generate a host object 50 for each host 2a, 2b connected to the fabrics 8a, 8b. The host object 50 maintains information on the host, such as a host name, identifier, etc. The host object 50 includes a host adaptor object 52 for each HBA 4a, 4b, 4c, 4d included in the host represented by the host object 50. The host adaptor object 52 includes information on the host adaptor 4a, 4b, 4c, 4d, such as a world wide name, network address, etc., and a host port object 54 for each host port 6a, 6b, 6c, 6d, 6e, 6f, 6g, 6h included in the HBA 4a, 4b, 4c, 4d represented by the host adaptor object 52. The host port object 54 includes a connected fabric 56 indicating the fabric 8a, 8b with which the port represented by the host port object 54 connects, a traffic metric 58 indicating the I/O throughput or number of I/O transactions that occur through the host port 6a, 6b, 6c, 6d, 6e, 6f, 6g, 6h represented by the host port object 54, and a connection metric 60 indicating a number of paths in which the host port 6a, 6b, 6c, 6d, 6e, 6f, 6g, 6h is configured. A port metric 62 comprises a value indicating a usage rate of the port, which may comprise a value calculated as a function of the traffic metric 58 and the connection metric 60.

Ports may have a port metric 62 indicating a higher usage, meaning the port is configured in a relatively high number of paths and/or the I/O traffic is relatively high, or indicating a lower usage, meaning the port is configured in a relatively low number of paths and/or the I/O traffic is relatively low.

In one embodiment, the port metric 62 may be calculated according to the following equation:

((Connection Metric)/(Total Possible Connections))+
((Traffic Metric)/(Traffic for all HBAs))

The "total possible connections" may differ for different types of HBAs, HBAs from different vendors, etc. The "traffic for all HBAs" may comprise the sum of the traffic metric 58 for all ports in all HBAs in the host 2a, 2b in which the host port 6a, 6b, 6c, 6d, 6e, 6f, 6g, 6h is included. Alternatively, the "traffic for all HBAs" may comprise a sum of the maximum possible I/O traffic rate at each of the ports in the host 2a, 2b including the port for which the connection metric is being recorded. In this way, the port metric 62 indicates a usage rate at a port, as determined by the relative number of paths in which the port is configured and the relative I/O traffic rate. The path planner 28 prefers to select ports to configure in paths that have a port metric 62 indicating a relatively lower usage rate so as to use ports configured in a relatively fewer number of paths and/or having a lower I/O traffic rate.

Alternative formulas and equations may be used to calculate the port metric 62. Such alternative techniques may calculate usage values reflecting a relative number of paths or connections in which the port is used and the traffic through the port. In alternative embodiments, different weightings may be applied when combining the relative connection usage of the port and relative traffic at the port to calculate the port metric. The port metric 62 thus may reflect two different types of usages for a port, the number of paths or connection in which the port is involved and the current traffic at the port. With the described embodiments, in the event that the traffic metric has not been updated and does not reflect the current traffic rate, the connection metric weights the port metric 62 to prefer selection of ports configured in a relatively fewer number of paths.

Figure 3:
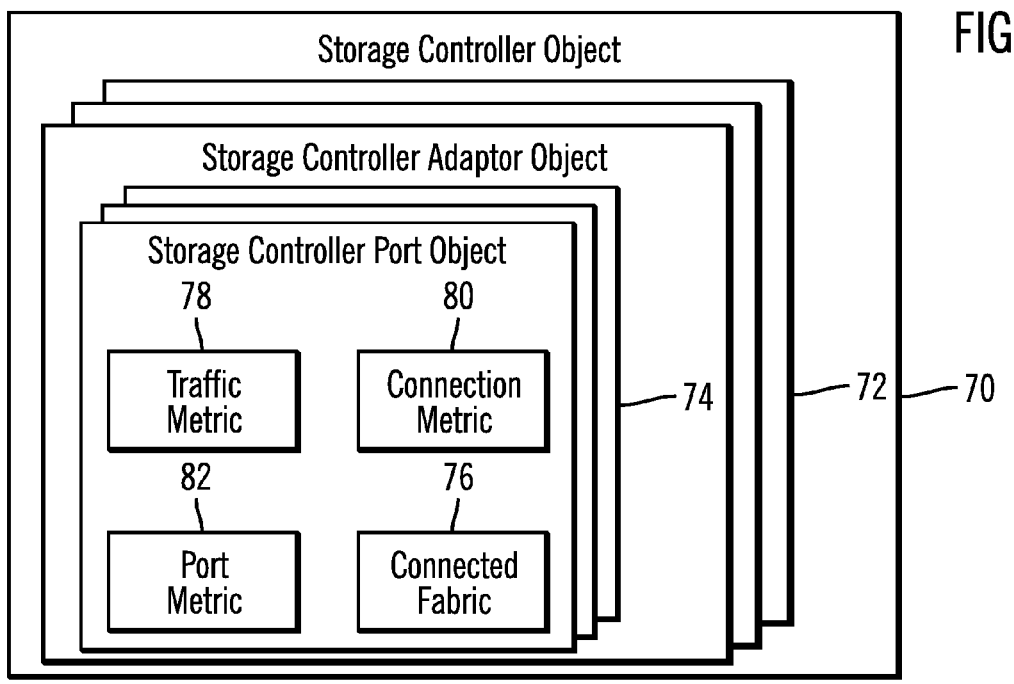
FIG. 3 illustrates an embodiment of a storage controller object.

FIG. 3 illustrates an embodiment of storage controller information 32. The path planner 28 may generate a storage controller object 70 for each storage controller 12a, 12b in the fabrics 8a, 8b. The storage controller object 70 maintains information on the storage controller 12a, 12b, such as a name, identifier, etc. The storage controller object 70 includes an adaptor object 72 for each adaptor 14a, 14b, 14c, 14d included in the storage controller 12a, 12b represented by the storage controller object 70. The storage controller adaptor object 72 includes information on the storage controller adaptor 14a, 14b, 14c, 14d, such as a world wide name, network address, etc., and a storage controller port object 74 for each storage controller port 16a, 16b, 16c, 16d, 16e, 16f, 16g, 16h included in the adaptor 14a, 14b, 14c, 14d represented by the storage controller object 72. The storage controller port object 74 includes a connected fabric 76 indicating the fabric 8a, 8b with which the port represented by the storage controller port object 74 is connected, a traffic metric 78 indicating the I/O throughput, number of I/O transactions that occur through the storage controller port 16a, 16b, 16c, 16d, 16e, 16f, 16g, 16h represented by the storage controller port object 74, and a connection metric 80 indicating a number of paths in which the storage controller port 16a, 16b, 16c, 16d, 16e, 16f, 16g, 16h is configured. A port metric 82 comprises a value indicating a usage rate of the port, which may comprise a value calculated as a function of the traffic metric 78 and the connection metric 70, as described above with respect to the host port metric 62.

Figure 4:
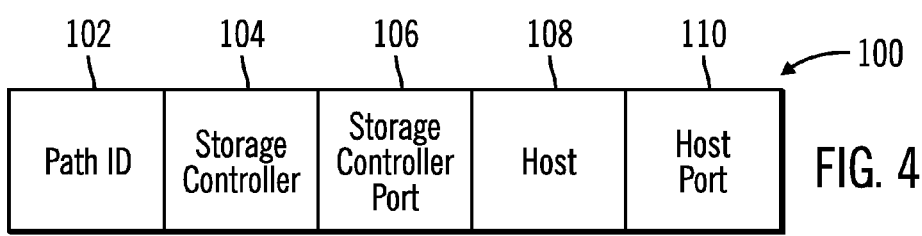
FIG. 4 illustrates an embodiment of a path database entry for a path.

FIG. 4 illustrates an embodiment of an entry 100 in the path database 30 providing information for one path configured between one host port 6a, 6b, 6c, 6d, 6e, 6f, 6g, 6h and one storage controller port 16a, 16b, 16c, 16d, 16e, 16f, 16g, 16h. A path entry 100 includes a path identifier (ID) 102, a storage controller 104 connected by the path, a storage controller port 106 in the path, a host 108 connected by the path, and the host port 110 in the path.

Figure 5:
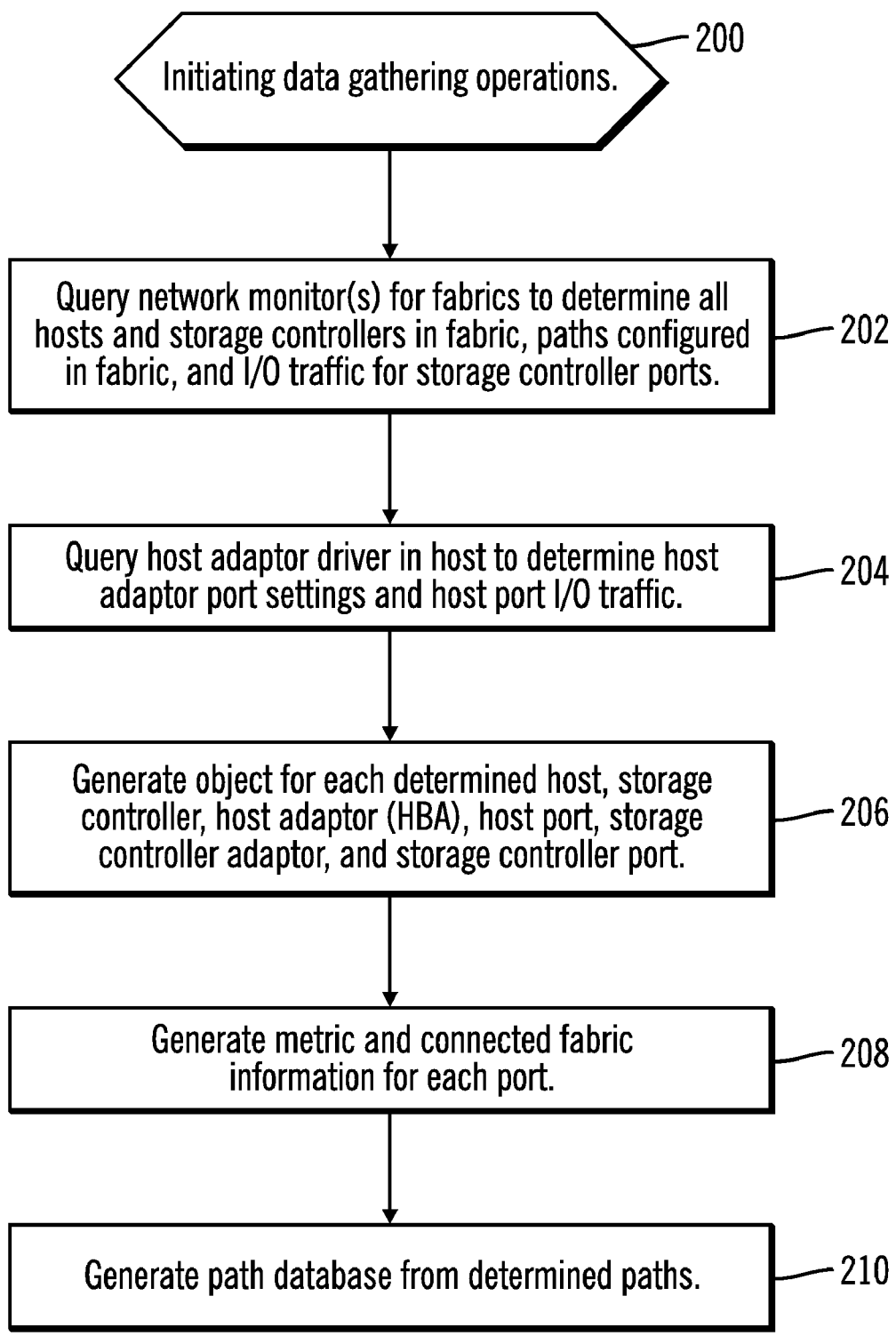
FIG. 5 illustrates an embodiment of operations to gather topology information and generate host and storage controller information and objects.

FIG. 5 illustrates an embodiment of operations the path planner 28 performs to gather information from components in the fabrics 8a, 8b to generate the storage controller 32 and host 34 information. Upon initiating (at block 200) data gathering operations, the path planner 28 queries (at block 202) the one or more network monitors 24 coupled to the fabrics 8a, 8b to determine the hosts 2a, 2b and storage controllers 12a, 12b in the fabric 8a, 8b, paths configured in the fabric 8a, 8b, and I/O traffic for storage controller ports 16a, 16b, 16c, 16d, 16e, 16f, 16g, 16h. The path planner 28 also queries (at block 204) the host adaptor drivers 10a, 10b in the determined hosts 2a, 2b to determine host adaptor port settings and host port I/O traffic for every host port 6a, 6b, 6c, 6d, 6e, 6f, 6g, 6h. The path planner 28 generates (at block 206) an object for each determined host 50, storage controller 70, host adaptor (HBA) 52, host port 54, storage controller adaptor 72, and storage controller port 74. The path planner 28 further generates (at block 208) metric 58, 60, 62, 78, 80, 82 and connected fabric 56, 76 information for each port. The path database 30 of path entries 100 is generated (at block 210) from the determined paths.

Figure 6:
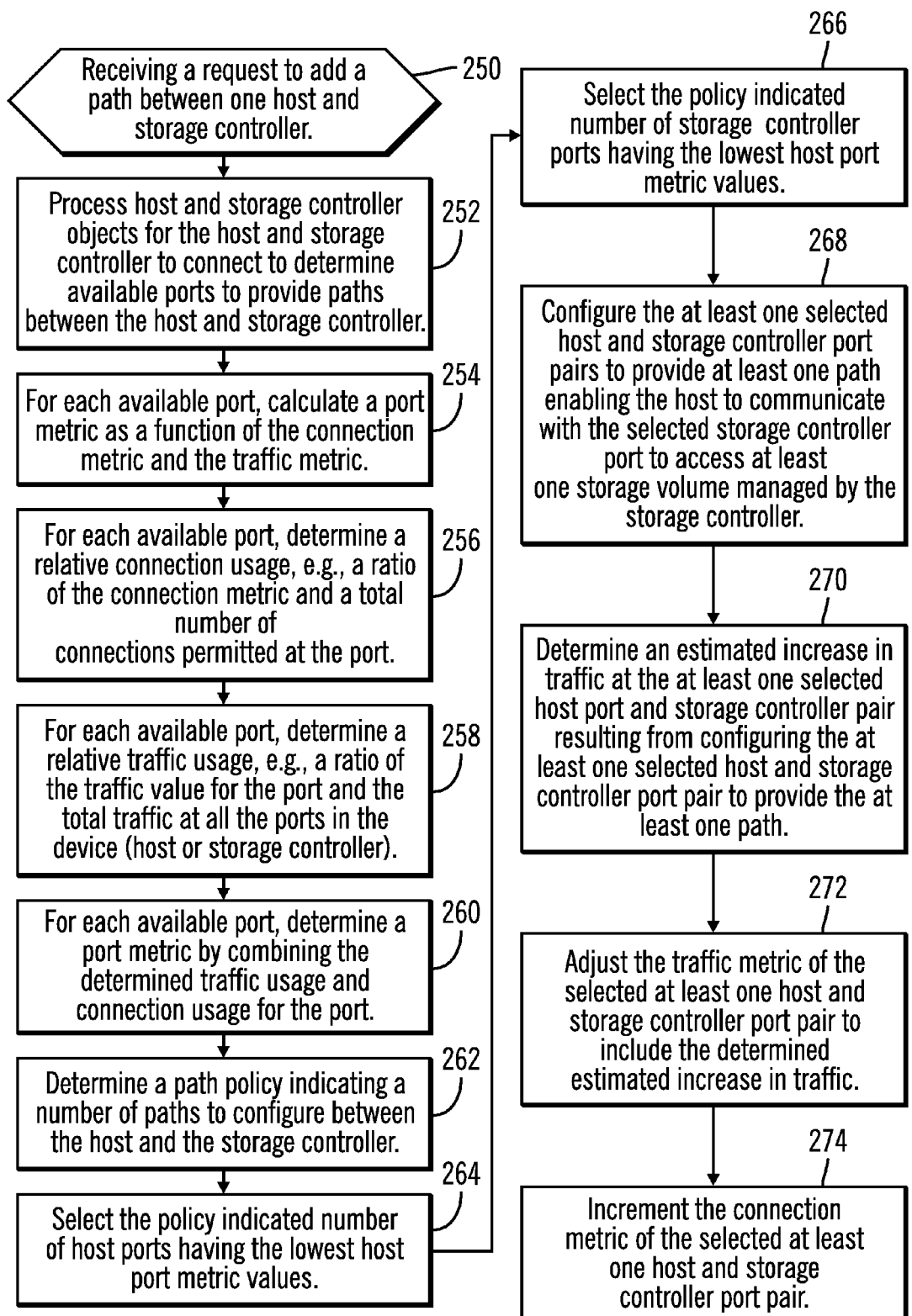
FIG. 6 illustrates an embodiment of operations to add a path between a host and storage controller.

FIG. 6 illustrates an embodiment of operations performed by the path planner 28 to add a path to one of the fabrics 8a, 8b to connect one host 2a, 2b and storage controller 12a, 12b. This operation may be initiated by a user via a user interface of the path planner 28 or by an application when assigning volumes 20a, 20b to a host 2a, 2b. Further, the operations may be performed as part of applying a policy 36 that requires redundant paths to be assigned to a host. Upon receiving (at block 250) a request to add a path between one host 2a, 2b and storage controller 12a, 12b, the path planner 28 processes (at block 252) host 50 and storage controller 52 objects for the host 2a, 2b and storage controller 12a, 12b to connect to determine available ports to provide one or more paths between the host 2a, 2b and storage controller 12a, 12b. For instance, the ports to consider may be the ports on possible paths between one host and one or more storage controllers. The path planner 28 may then calculate (at block 254) a port metric 62, 82 for each available port as a function of the connection metric and the traffic metric. Alternatively, the path planner 28 may use a previously calculated port metric 62, 82. Blocks 256-260 provide an embodiment of operations to calculate the port metric 62, 82 for the available host and storage controller ports that may be used for the path. At block 256, the path planner 28 determines for each available host and storage controller port, a relative connection usage, e.g., a ratio of the connection metric and a total number of connections permitted at the port. The path planner 28 further determines (at block 258), for each available host and storage controller port, a relative traffic usage, e.g., a ratio of the traffic value for the port and the total traffic at all the ports in the device (host or storage controller). For each available host and storage controller port that can be used for a path, the port metric 62, 82 is determined (at block 260) by combining the determined traffic usage and connection usage for the port. Different weightings may be used when combining these values.

The path planner 28 further determines (at block 262) whether a policy 36 indicates a number of paths to configure between the host and the storage controller. A policy may further indicate whether redundant paths should use different fabrics 8a, 8b, storage controllers, etc. If there is no specified path policy in the policy information 36, then the path policy may comprise a predetermined default or minimum number of one or more paths. The path planner 28 selects (at block 264) the determined policy indicated number of host ports 6a, 6b, 6c, 6d, 6e, 6f, 6g, 6h having the lowest host port metric 62 values and selects (at block 266) the policy indicated number of storage controller ports 16a, 16b, 16c, 16d, 16e, 16f, 16g, 16h having the lowest host port metric 82 values. The path planner 28 then configures (at block 268) the at least one selected host and storage controller port pairs to provide at least one path enabling the host to communicate with the selected storage controller port to access at least one storage volume 20a, 20b managed by the storage controller 12a, 12b. Port pairs may include one host port connected to multiple storage controller ports or multiple host ports connected to one storage controller port.

The path planner 28 may then dynamically adjust the traffic 58 and connection 60 metrics for the ports used in the added paths to update their information to reflect changes likely to occur as a result of adding the path. To dynamically adjust, the path planner 28 may determine (at block 270) an estimated increase in traffic at the at least one selected host port and storage controller pair resulting from configuring the at least one selected host and storage controller port pair to provide the at least one path. The traffic metric 62, 80 of the selected at least one host and storage controller port pair are adjusted (at block 272) to include the determined estimated increase in traffic. Further, the connection metric 60, 80 for the selected at least one host and storage controller port pair are incremented (at block 274) to reflect that they are not included in an additional path. The path database 30 may also be updated to include entries 100 (FIG. 4) for any added paths.

Figure 7:
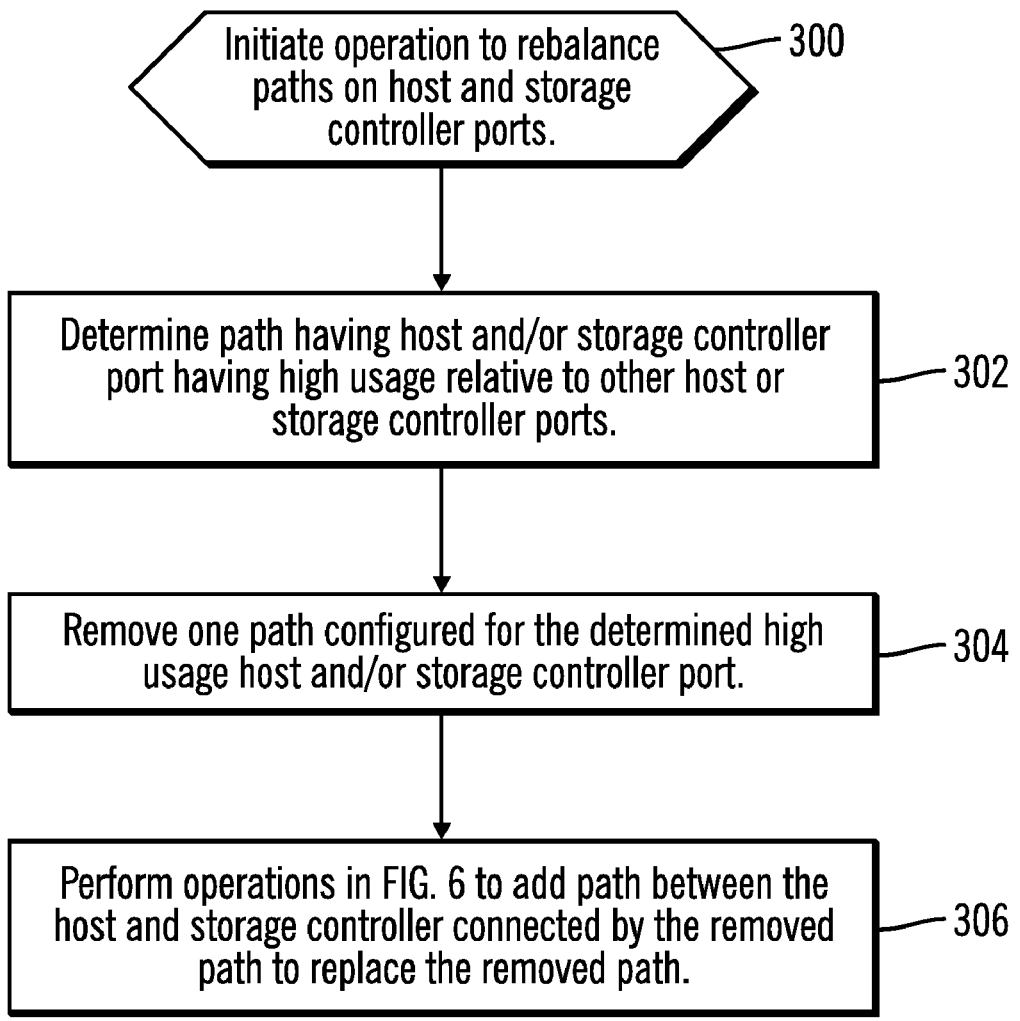
FIG. 7 illustrates an embodiment of operations to rebalance paths configured between host and storage controller ports.

FIG. 7 illustrates an embodiment of operations performed by the path planner 28 to rebalance the assignment of ports to paths in order to reassign paths from more heavily used ports, in terms of connections and traffic, to lesser used ports. Upon initiating (at block 300) the rebalance operation, the path planner 28 determines (at block 302) a path having a host and/or storage controller port having a high usage (e.g., configured in a relatively high number of connections and/or having relatively high I/O traffic) relative to other host 6a, 6b, 6c, 6d, 6e, 6f, 6g, 6h or storage controller 16a, 16b, 16c, 16d, 16e, 16f, 16g, 16h ports. The path planner 28 removes (at block 304) one path configured for the determined high usage host and/or storage controller port. The path planner 28 then performs (at block 306) the operations in FIG. 6 to add a path between the host and storage controller connected by the removed path to replace the removed path with a path having ports with a lower usage, e.g., lower connection and traffic usage.

Described embodiments select host and storage controller ports to use for a path between a host and storage controllers in fabrics by selecting ports based on one having the lowest usage. In certain embodiments, the usage used to select paths may be based on the amount of traffic occurring at the port and the number of paths in which the port is currently configured.

Figure 8:
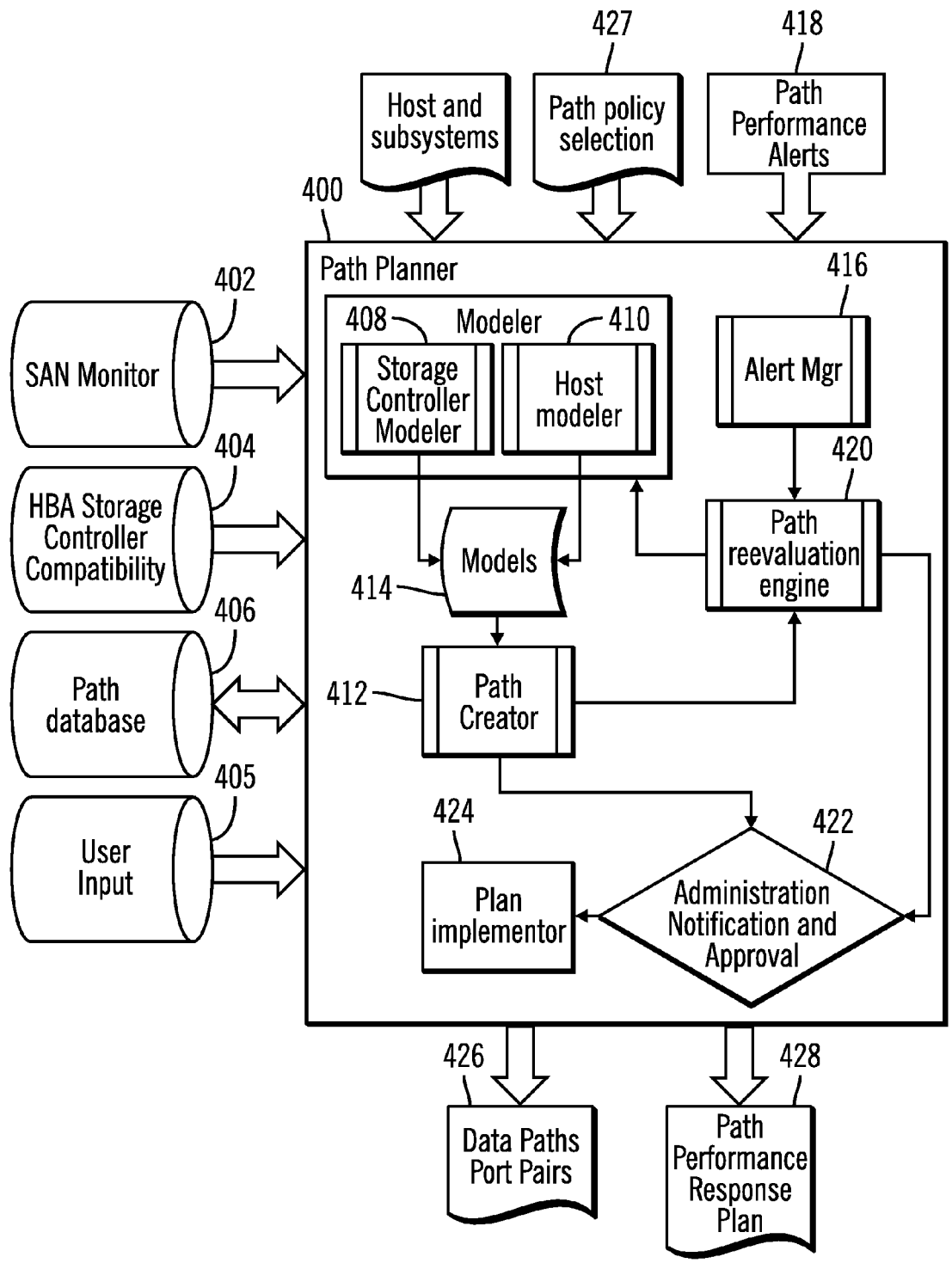
FIG. 8 illustrates an embodiment of path planner components.

FIG. 8 shows an additional embodiment of a path planner 400 operating in a SAN. The path planner 400 interacts with outside components and a user interface module including a SAN monitor 402 comprising a network monitoring system that collects statistics from SAN components; HBA storage controller compatibility 404 provides an information repository that contains which host bus adaptors (HBAs) each storage controller supports, which storage controllers each HBA multi-path driver supports, and the available settings and options for each HBA multi-path driver; user input 405 comprising a user interface that allows for the selection/input of host(s) and storage controller(s) and selection of path policies; and a path database 406 comprising a database used for storing data path plans and policy settings.

The path planner 400 includes a storage controller modeler 408, a host modeler 410, and a path creator 412. The storage controller modeler 408 creates a model 414 (e.g., storage controller object 70 in FIG. 3) for each storage controller 12a, 12b from the user input and network topology information collected by the network monitoring system, calculates the SAN port load for each storage controller port 16a, 16b, 16c, 16d, 16e, 16f, 16g, 16h, assigns a port metric 62 to each port, and groups storage controller ports 16a, 16b, 16c, 16d, 16e, 16f, 16g, 16h by fabric 8a, 8b. The host modeler 410 creates a model 414 (e.g., host object 40 in FIG. 2) for each host 2a, 2b from the user input and from the network topology information collected by the network monitoring system, calculates the SAN port load for each host port 6a, 6b, 6c, 6d, 6e, 6f, 6g, 6h, assigns availability metric to each host port 6a, 6b, 6c, 6d, 6e, 6f, 6g, 6h, and groups host ports 6a, 6b, 6c, 6d, 6e, 6f, 6g, 6h by fabric 8a, 8b. The host modeler 410 may further select the most appropriate multi-path driver settings for each HBA driver 10a, 10b and then configure the host bus drivers 10a, 10b with those settings.

The path creator 412 creates data paths 426 through host port 6a, 6b, 6c, 6d, 6e, 6f, 6g, 6h and storage controller port 16a, 16b, 16c, 16d, 16e, 16f, 16g, 16h pairs by verifying the compatibility between each host port 6a, 6b, 6c, 6d, 6e, 6f, 6g, 6h and each storage controller 12a, 12b and ranking hosts 2a, 2b by the number of possible data paths between each host 2a, 2b and each storage controller 12a, 12b, subsystem. The path creator 412 may further start path selection with one storage controller 12a, 12b and the lowest ranked host port 6a, 6b, 6c, 6d, 6e, 6f, 6g, 6h, construct data paths between the host and storage controller, and repeating for each host in rank order. The data path construction operations may be performed for each additional storage controller. The path policies are used to determine the number of required data paths and the number of fabrics required.

An alert manager 416 receives path performance alerts 418, extracts relevant data and path information from the alert text (host, subsystem, volumes, Fibre Channel ports), and invokes a path reevaluation engine 420. The path reevaluation engine 420 queries the policies and data path plans from the path database 406, invokes the path planning process by sending the host, storage controller, and policy information to the modeling 408, 410 and path creator 412 modules, compares the new plan with the current plan to form the response plan, and sends this plan to the notification and approval module 422. Upon receipt of a plan from the path creator 412, the notification and approval module 422 notifies a SAN administrator of the plan 428 and waits for plan approval or rejection. When a plan is approved, the notification and approval module 422 passes the plan to the plan implementer 424. Upon receipt of a plan from the reevaluation module 420, the notification and approval module 422 sends notification to a SAN administrator and waits for approval before passing plan 428 to the plan implementer 424 (if notification on reevaluation is set) or sends the plan 428 to plan implementer 424 directly.

The plan implementer 424 interacts with the SAN management system or configured SAN Fabric switches to implement SAN zoning and interacts with host agents to configure multi-path parameter changes. The path policies 427 may indicate to use multiple paths if there should be only one or multiple paths between each host 2a, 2b and each storage controller 12a, 12b. If a use multiple paths policy is selected, then the path creator 412 uses policy inputs comprising a number of paths, fully redundant paths, and I/O or application requirements. Further the path creator 414 verifies the existences of a multi-path driver on each host 2a, 2b. A "number of paths" policy allows for the input of the desired number of paths between each host and each storage subsystem. If a number is not entered, a default number of paths is used. A "full redundant paths" policy indicates that the paths should be distributed evenly across two or more fabrics 8a, 8b that are in common between each host and storage controller. If selected, then the number of paths must be even, there must be at least two common fabrics between the host and storage controller, and a sufficient number of possible paths in each common fabric. An "I/O or application requirements" policy indicates required peak and sustained traffic levels, read response time and write response time, and a type of traffic behavior (for example burst, continual, or periodic). The path creator 414 uses the path policy information to determine the number of paths and host multi-path driver parameters.

A host multi-path driver policy allows for the selection of multi-path driver path mode, such as fail-over, round robin, and load balancing. A path robustness policy specifies required reliability and amount of slowdown on failure metrics used for determining if multiple fabrics are needed and the required number of paths per fabric for the selected multi-path driver mode. A path performance alert policy indicates whether to notify an administrator once a path performance response plan 428 is created or allow the planner to perform updates without approval.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 9:
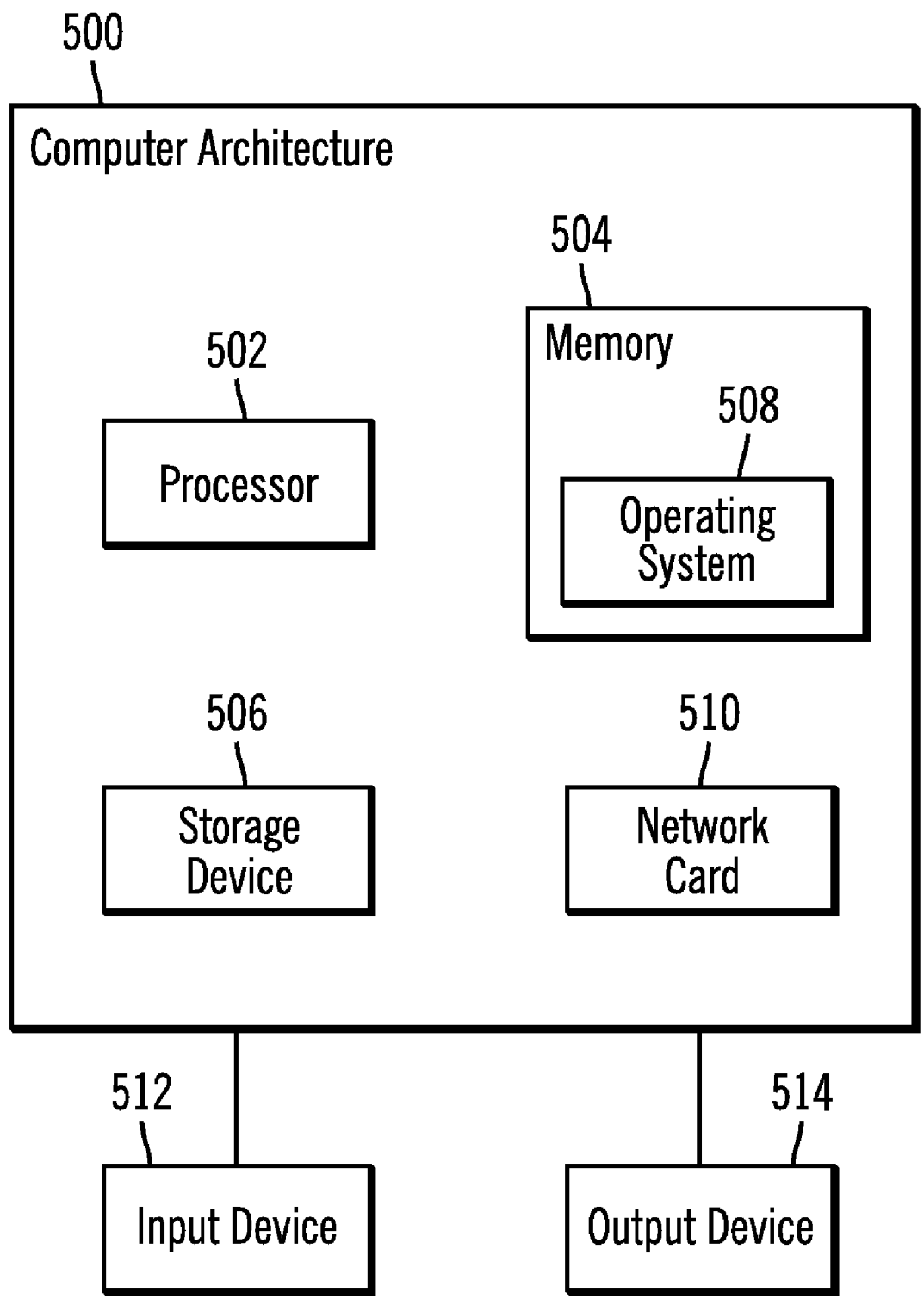
FIG. 9 illustrates an embodiment of a computer architecture that may be used in the network components.

FIG. 9 illustrates one implementation of a computer architecture 500 that may be implemented at the hosts 2a, 2b, storage controllers 12a, 12b, management system 26, and network monitor 24 of FIG. 1. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs, including an operating system 508, device drivers and application programs, in the storage 506 are loaded into the memory 504 and executed by the processor 502 in a manner known in the art. The architecture further includes a network card 510 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information transmitted from the processor 502, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    gathering information on ports on at least one host, ports on at least one storage controller managing access to storage volumes, and at least one fabric over which the at least one host and storage controller ports connect;
    gathering, for at least one host port and storage controller port, information on a connection metric indicating a number of paths in which the port is configured and a traffic metric indicating Input/Output (I/O) traffic at the port;
    determining available ports for one host and storage controller that are available to provide paths between one host and storage controller;
    processing the connection and traffic metrics for the available host ports to select at least one host port;
    processing the connection and traffic metrics for the available storage controller ports to select at least one storage controller port; and
    configuring the at least one selected host and storage controller port pair to provide at least one path enabling the host to communicate with the selected storage controller port to access at least one storage volume managed by the selected storage controller.

2. The method of claim 1, further comprising:
    determining a path policy indicating a number of paths to configure between the host and the storage controller, wherein a number of the selected at least one host and storage controller port pairs comprise the number of paths required by the determined path policy, and wherein the indicated number of paths are configured between selected host and storage controller ports.

3. The method of claim 1, further comprising:
    for at least one port, calculating a port metric as a function of the connection metric and the traffic metric, wherein selecting the host port comprises selecting the host port based on the port metrics of the available host ports, and wherein selecting the storage controller port comprises selecting the storage controller based on the port metrics of the storage controller port.

4. The method of claim 3, wherein calculating the port metric for the host and storage controller ports comprises:
    determining from the connection metric a connection usage indicating a relative value for a number of paths in which the port is configured; and
    determining from the traffic metric a traffic usage comprising a relative value of the I/O traffic at the port; wherein the port metric comprises a function of the connection usage and the traffic usage values.

5. The method of claim 4, wherein determining the connection usage value for the host and storage controller ports comprises determining a ratio of the connection metric and a maximum number of connections permitted at the port and wherein determining the traffic usage comprises determining a ratio of the traffic at the port and a total traffic at all the ports in an adaptor including the port for which the traffic usage is being determined, wherein the selected host port comprises the host port having a lowest port metric of the available host port metrics and wherein the selected storage controller port comprises the storage controller port having a lowest port metric of the available storage controller port metrics.

6. The method of claim 1, further comprising:
    determining an estimated increase in traffic at the at least one selected host port and storage controller pair resulting from configuring the at least one selected host and storage controller port pair to provide the at least one path; and
    adjusting the traffic metric of the selected at least one host and storage controller port pair to include the determined estimated increase in traffic.

7. The method of claim 1, wherein gathering the information further comprises:
    querying host bus adaptor (HBA) drivers in the at least one host to obtain information on the host ports;
    querying a network manager to obtain information on the storage controller ports.

8. The method of claim 1, further comprising:
    incrementing the selected storage controller port and host pair connection metric.

9. The method of claim 1, further comprising:
    receiving a request to provide one host access to a storage volume managed by one of the storage controllers, wherein the available ports are determined for the host indicated in the request and the storage controller providing access to the storage volume indicated in the request, and wherein the configured path enables the host indicated in the request to access the storage volume indicated in the request.

10. The method of claim 1, further comprising:
    processing the connection and traffic metrics for host ports to determine one host or storage controller port having a high usage relative to other host or storage controller ports; and
    removing one path configured for the determined high usage host or storage controller port, wherein the available and selected host and storage controller ports for which the path is configured are on the host and storage controller connected by the removed path, wherein the configured at least one path replaces the removed path.

11. The method of claim 10, further comprising:
   determining an estimated decrease in I/O traffic at the host and storage controller ports in the removed path;
   adjusting the traffic metric of the host and storage controller ports in the removed path by subtracting the estimated decrease in I/O traffic; and
   decrementing the host and storage controller ports in the removed path.

12. A system in communication with ports on at least one host, ports on at least one storage controller managing access to storage volumes, and at least one fabric over which the at least one host and storage controller ports connect, comprising:
   a processor;
   computer readable media;
   a path planner in the computer readable media executed by the processor to perform operations, the operations comprising:
      gathering information on the ports on the at least one host, the ports on the at least one storage controller, and the at least one fabric over which the at least one host and storage controller ports connect;
      gathering, for at least one of the host port and storage controller port, information on a connection metric indicating a number of paths in which the port is configured and a traffic metric indicating Input/Output (I/O) traffic at the port;
      determining available ports for one host and storage controller that are available to provide paths between one host and storage controller;
      processing the connection and traffic metrics for the available host ports to select at least one host port;
      processing the connection and traffic metrics for the available storage controller ports to select at least one storage controller port; and
      configuring the at least one selected host and storage controller port pair to provide at least one path enabling the host to communicate with the selected storage controller port to access at least one storage volume managed by the selected storage controller.

13. The system of claim 12, wherein the operations further comprise:
   for at least one port, calculating a port metric as a function of the connection metric and the traffic metric, wherein selecting the host port comprises selecting the host port based on the port metrics of the available host ports, and wherein selecting the storage controller port comprises selecting the storage controller based on the port metrics of the storage controller port.

14. The system of claim 13, wherein calculating the port metric for the host and storage controller ports comprises:
   determining from the connection metric a connection usage indicating a relative value for a number of paths in which the port is configured; and
   determining from the traffic metric a traffic usage comprising a relative value of the I/O traffic at the port; wherein the port metric comprises a function of the connection usage and the traffic usage values.

15. The system of claim 14, wherein determining the connection usage value for the host and storage controller ports comprises determining a ratio of the connection metric and a maximum number of connections permitted at the port and wherein determining the traffic usage comprises determining a ratio of the traffic at the port and a total traffic at all the ports in an adaptor including the port for which the traffic usage is being determined, wherein the selected host port comprises the host port having a lowest port metric of the available host port metrics and wherein the selected storage controller port comprises the storage controller port having a lowest port metric of the available storage controller port metrics.

16. The system of claim 12, wherein the operations further comprise:
   processing the connection and traffic metrics for host ports to determine one host or storage controller port having a high usage relative to other host or storage controller ports; and
   removing one path configured for the determined high usage host or storage controller port, wherein the available and selected host and storage controller ports for which the path is configured are on the host and storage controller connected by the removed path, wherein the configured at least one path replaces the removed path.

17. An article of manufacture comprising a computer readable storage medium including code executed to communicate with ports on at least one host, ports on at least one storage controller managing access to storage volumes, and at least one fabric over which the at least one host and storage controller ports connect and to cause operations to be performed, the operations comprising:
   gathering information on the ports on the at least one host, ports on the at least one storage controller managing access to storage volumes, and the at least one fabric over which the at least one host and storage controller ports connect;
   gathering, for at least one host port and storage controller port, information on a connection metric indicating a number of paths in which the port is configured and a traffic metric indicating Input/Output (I/O) traffic at the port;
   determining available ports for one host and storage controller that are available to provide paths between one host and storage controller;
   processing the connection and traffic metrics for the available host ports to select at least one host port;
   processing the connection and traffic metrics for the available storage controller ports to select at least one storage controller port; and
   configuring the at least one selected host and storage controller port pair to provide at least one path enabling the host to communicate with the selected storage controller port to access at least one storage volume managed by the selected storage controller.

18. The article of manufacture of claim 17, wherein the operations further comprise:
   for at least one port, calculating a port metric as a function of the connection metric and the traffic metric, wherein selecting the host port comprises selecting the host port based on the port metrics of the available host ports, and wherein selecting the storage controller port comprises selecting the storage controller based on the port metrics of the storage controller port.

19. The article of manufacture of claim 18, wherein calculating the port metric for the host and storage controller ports comprises:
   determining from the connection metric a connection usage indicating a relative value for a number of paths in which the port is configured; and
   determining from the traffic metric a traffic usage comprising a relative value of the I/O traffic at the port; wherein the port metric comprises a function of the connection usage and the traffic usage values.

20. The article of manufacture of claim 19, wherein determining the connection usage value for the host and storage controller ports comprises determining a ratio of the connection metric and a maximum number of connections permitted at the port and wherein determining the traffic usage comprises determining a ratio of the traffic at the port and a total traffic at all the ports in an adaptor including the port for which the traffic usage is being determined, wherein the selected host port comprises the host port having a lowest port metric of the available host port metrics and wherein the selected storage controller port comprises the storage controller port having a lowest port metric of the available storage controller port metrics.

21. The article of manufacture of claim 17, wherein the operations further comprise:

processing the connection and traffic metrics for host ports to determine one host or storage controller port having a high usage relative to other host or storage controller ports; and removing one path configured for the determined high usage host or storage controller port, wherein the available and selected host and storage controller ports for which the path is configured are on the host and storage controller connected by the removed path, wherein the configured at least one path replaces the removed path.

* * * * *